United States Patent
Buckler

(10) Patent No.: US 7,509,336 B2
(45) Date of Patent: Mar. 24, 2009

(54) WORKLOAD PERIODCITY ANALYZER FOR AUTONOMIC DATABASE COMPONENTS

(75) Inventor: Andrew David Buckler, Markham (CA)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/015,826

(22) Filed: Dec. 17, 2004

(65) Prior Publication Data

US 2006/0136370 A1 Jun. 22, 2006

(51) Int. Cl.
G06F 17/30 (2006.01)
(52) U.S. Cl. .................... 707/102; 707/100; 707/101
(58) Field of Classification Search .......... 707/100–102
See application file for complete search history.

(56) References Cited

U.S. PATENT DOCUMENTS

| 6,067,412 | A | 5/2000 | Blake et al. | |
|---|---|---|---|---|
| 6,493,810 | B1 | 12/2002 | Pang et al. | |
| 6,622,221 | B1 | 9/2003 | Zahavi | |
| 6,665,732 | B1 * | 12/2003 | Garofalakis et al. | 709/247 |
| 2002/0133681 | A1 | 9/2002 | McBrearty et al. | |
| 2003/0065548 | A1 | 4/2003 | Schmidt | |
| 2003/0163608 | A1 | 8/2003 | Tiwary et al. | |

FOREIGN PATENT DOCUMENTS

JP 7-219994 A 8/1995

OTHER PUBLICATIONS

Near-Optimal Sparse Fourier Representatives via Sampling, Gilbert et al. STOC'02, May 19-21, 2002, Montreal, Quebec, Canada.*
L.C. Boer: "Workload-watch as an element of human engineering testing and evaluation,", Eleventh Ship Control Systems Symposium, vol. 2, Computational Mechanics Publications, Southampton, Boston, USA, Apr. 1997.
Rafael H. Saavedra et al.: "Analysis of Benchmark Characteristics and Benchmark Performance Predition," ACM Transactions on Computer Systems, vol. 14, No. 4, Nov. 1996, pp. 344-384.
Said Elnaffar et al.: "Automatic Workload Identification for Autonomic DBMSs," WOSS '2, Nov. 18-19, 2002, Charleston, SC, USA.
Fang Liu et al: "Finding Periodicity in Space and Time," M.I.T. Media Laboratory Perceptual Computing Section Technical Report No. 435, Proceedings of the International Conference on Computer Vision, Bombay, India, Jan. 4-7, 1998.
Peter A. Dinda et al.: Host Load Prediction Using Linear Models, Cluster Computing 0 (2001).
L.C. Boer: "Workload-watch as an element of human engineering testing and evaluation," Eleventh Ship Control Systems Symposium, vol. 2, Computational Mechanics Publications, Southampton, Boston, USA, Apr. 1997.

(Continued)

*Primary Examiner*—Yicun Wu
(74) *Attorney, Agent, or Firm*—Sughrue Mion, PLLC

(57) ABSTRACT

A data processing system implemented method for determining database workload periodicity. The data processing system implemented method includes converting database activity samples spanning a time period from the dime domain to the frequency domain, the converting resulting in a frequency spectrum, identifying fundamental peaks of the frequency spectrum, and allocating database resources based on at least one of the fundamental peaks.

11 Claims, 8 Drawing Sheets

OTHER PUBLICATIONS

Nelson Weiderman: "Hartstone: Synthetic Benchmark Requirements for Hard Real-Time Applications," ACM Digital Library, Ada Letters Special Edition, vol. X, No. 3, 1990, pp. 126-136.

Rafael H. Saavedra et al.: "Analysis of Benchmark Characteristics and Benchmark Performance Predition," ACM Transactions on Computer Systems, vol. 14, No. 4, Nov. 1996, pp. 344-384.

Jiawei Han, School of computing Science, Simon Fraser University; Guozhu Dong, Department of Computer Science and Engineering, Wright State University; and Yiwen Yin , School of Computing Science, Simon Fraser University: "Efficient Mining of Partial Periodic Patterns in Time Series Database," 1999.

Said Elnaffar et al.: "Automatic Workload Identification for Autonomic DBMSs, "WOSS '2, Nov. 18-19, 2002, Charleston, SC, USA.

Philip S. Yu, et al.: "On Workload Characterization of Relational Database Environments," IBM Thomas J. Watson Research Center, Yorktown Heights, NY, 1992.

Fang Liu et al: "Finding Periodicity in Space and Time," M.I.T. Media Laboratory Perceptual Computing Section Technical Report No. 435, Proceedings of the International Conference on Computer Vision, Bonbay, India, Jan. 4-7, 1998.

Peter A. Dinda et al.: Host Load Predition Using Linear Models, Cluster Computing 0 (2001).

Peter A Dinda: "The Statistical Properites of Host Load," Carnegie Mellon University, Pittsburgh, PA, USA, Jul. 1998.

\* cited by examiner

WORKLOAD PERIODCITY ANALYZER FOR AUTONOMIC DATABASE COMPONENTS

FIELD OF THE INVENTION

The present invention relates to databases, and more particularly to the determination of periodicity in database workloads.

BACKGROUND

Autonomic computing is a self-managing computing model named after the human body's autonomic nervous system. An autonomic computing system is capable of controlling the functioning of computer applications and systems without input from the user, in the same way that the autonomic nervous system regulates body systems without conscious input from the individual. The goal of autonomic computing is to create self-executing systems capable of high-level functioning while shielding users from system complexity.

Workload characterization is a fundamental issue in autonomic computing. In order to effectively allocate system resources to a particular computing task, an autonomic system should have the ability to characterize the workload of the computing task.

An important aspect of workload characterization is determination of workload periodicity. Workload periodicity refers to the tendency of a workload to place cyclic demands on processing power. For example, if an e-commerce web site shows a peak load (i.e. maximum activity) between 5 PM and 8 PM, a minimum load between 5 AM and 8 AM, and decreasing/increasing loads between the two extremes, a workload periodicity analysis should reveal the workload to have a strong cyclic structure. The closer the activity pattern is to a perfect sine/cosine wave, the stronger the cyclic nature or "structure" of the workload. The strength of a cyclic structure would be decreased by the presence of random noise or by non-periodic events.

A workload periodicity analysis not only evidences a workload's historical characteristics, it may also be used predict workload trends into the future. Such workload forecasting may permit the processing efficiency of an autonomic computing system to be improved, as the system may be able to "preemptively" allocate resources, prior to expected peaks in processing demand.

As database systems move towards the autonomous computing model, a periodicity analyzer for database workloads would be desirable.

SUMMARY

In accordance with an aspect of the present invention there is provided a data processing system implemented method of directing a data processing system to determine database workload periodicity, the data processing system implemented method including converting database activity samples spanning a time period from the time domain to the frequency domain, the converting resulting in a frequency spectrum, identifying fundamental peaks of the frequency spectrum, and allocating database resources based on at least one of the fundamental peaks.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the present invention:

FIG. 9 illustrates the application of Wold decomposition to the energy-density spectrum of FIG. 8; and.

DETAILED DESCRIPTION

An embodiment of the present invention analyzes database workload data to identify any periodic (i.e. cyclic) patterns in workload intensity that may be present. If periodic patterns are detected, workload period duration information may be extracted from the data along with a confidence metric estimating the strength of the cyclic structure. A high level of confidence indicates that the periodic pattern is likely to repeat. The analysis may be used by autonomous database components to predict the time and approximate intensities of peak workload levels occurring in the future, so that database system resources may be allocated accordingly.

Briefly, an embodiment of the database workload periodicity analysis is performed as follows. Initially, a set of database activity samples is converted from the time domain to the frequency domain. The resulting frequency spectrum is then used to create an energy-density spectrum which reflects the energy of workload components at different frequencies. Fundamental peaks in the energy-density spectrum are identified. The power of identified fundamental peaks is computed, accounting for associated harmonics. The power of a fundamental peak and associated harmonics reflects the degree to which a workload period corresponding to the peak dominates the database workload. A confidence metric indicative of the degree to which the workload cycle approximates a sinusoid may be produced by dividing the peak power by the sum of the peak power and non-peak power. Fundamental peaks may be identified within the frequency spectrum rather than the energy-density spectrum in some embodiments.

Figure 1:
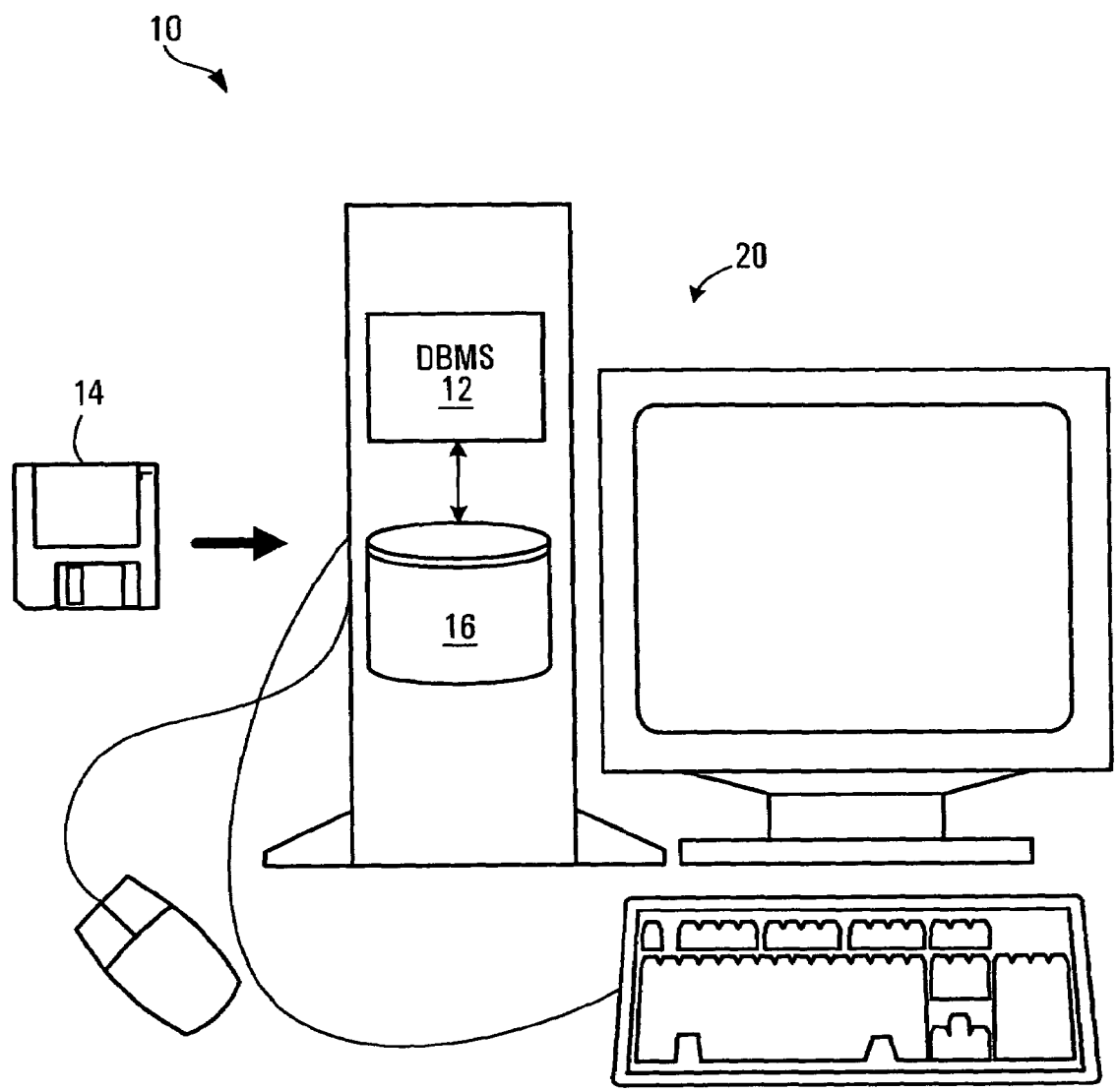
FIG. 1 illustrates a database system exemplary of an embodiment of the present invention.

Referring to FIG. 1, a database system 10 is illustrated. Database system 10 comprises a computer system 20 executing a database management system (DBMS) 12. The computer system 20 may be a server such as the IBM® eServer 325 for example. The computer system includes a processor (not shown) interconnected with memory including non-volatile memory 16, which may be used to store data comprising the database. The DBMS 12 may be a commercially available relational database management system modified to operate as described herein. In the present embodiment, the DMBS 12 is a modified version of the IBM® DB2 Universal Database Version 8.1. The modifications provide the system with the ability to perform database workload periodicity analysis, in a manner that will be described. The DBMS 12 may be loaded into the computer system 20 from a machine-readable medium 14, which could be a disk, a tape, a chip or a random access memory containing a file downloaded from a remote source.

Figure 2:
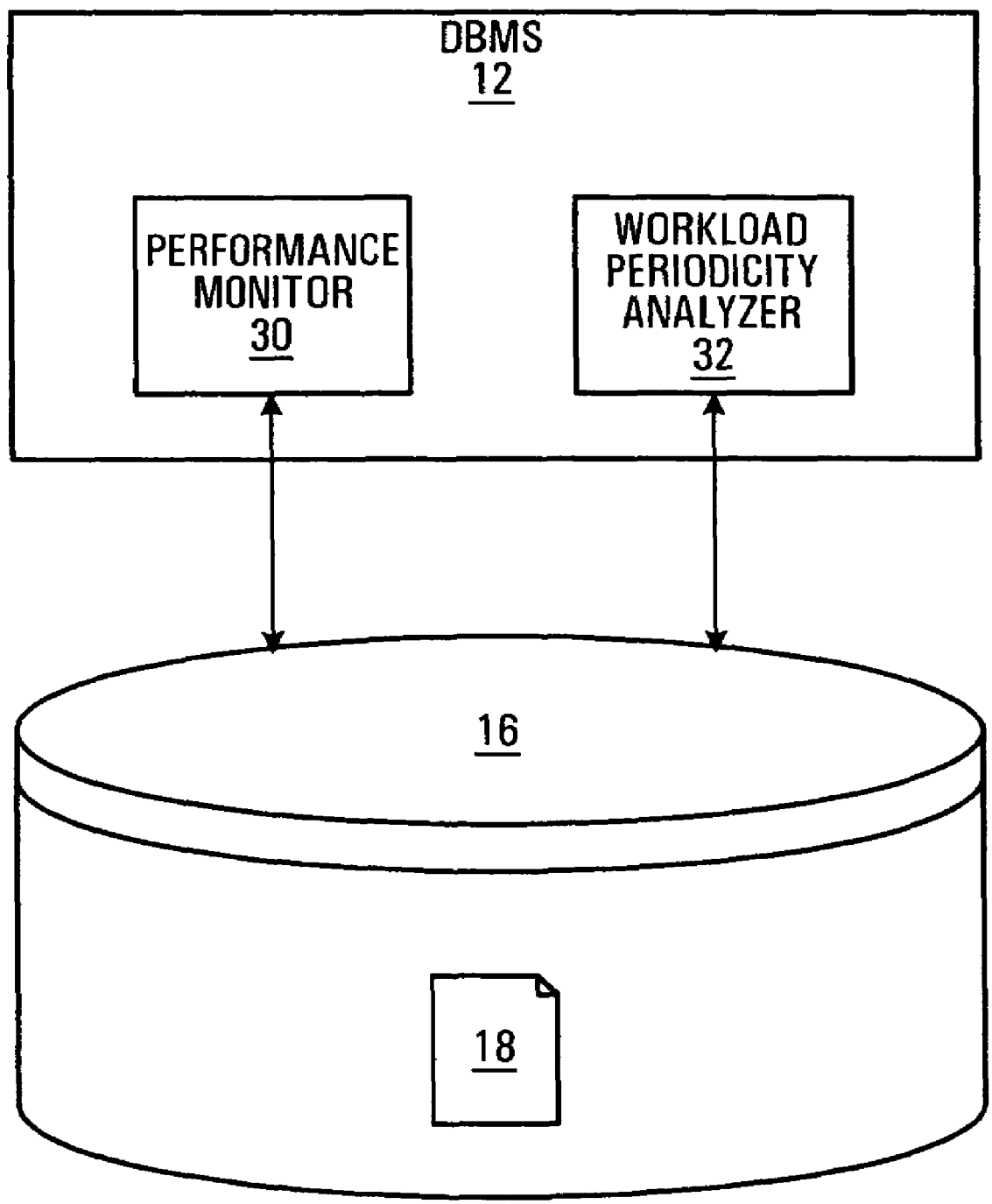
FIG. 2 illustrates certain components the database system of FIG. 1 in greater detail.

FIG. 2 illustrates certain components of the database system 10, namely DBMS 12 and non-volatile memory 16, in greater detail.

As shown in FIG. 2, DBMS 12 includes a performance monitor 30 and a workload periodicity analyzer (abbreviated "WORPAZ") 32. Other components of DBMS 12 are omitted for clarity.

The performance monitor 30 is a module responsible for monitoring the performance of the database system 10. The performance monitor 30 is configured to sample database activity at regular intervals in time and to store these samples in a file 18 in non-volatile memory 16. In the present embodiment, the performance monitor 30 is the DB2 "Snapshot Monitor" interface. As known to those skilled in the art, the DB2 Snapshot Monitor is a software component which allows samples (i.e. "snapshots") of the state of database activity to be taken at particular points in time. The samples may capture various metrics indicative of database activity at the sampled moments, such as the number of database commands (e.g. Structured Query Language (SQL) statements) executed in a preceding time period for example. From the perspective of characterizing load, the metrics should encompass activity in respect of lower level objects such as tables (e.g. rows_deleted, rows_inserted, rows_updated, rows_selected, rows_read, and rows_written, or sums of these). A list illustrative of various types of database metrics that could be employed can be found in the DB2 System Monitor Guide and Reference, published by IBM®.

The workload periodicity analyzer 32 is a module responsible for analyzing the periodicity of the workload of database system 10. The WORPAZ 32 reads the database activity samples stored in file 18 and uses this workload data to analyze workload periodicity. The WORPAZ 32 may be part of an autonomic computing database component which controls the behavior of the database system 10 based on anticipated workload. The workload periodicity analyzer 32 executes periodically on database system 10 (e.g. at regular time intervals, which may be 10 minutes intervals for example).

FIGS. 3 to 9 illustrate exemplary database workload data at various stages of workload periodicity analysis.

Figure 3:
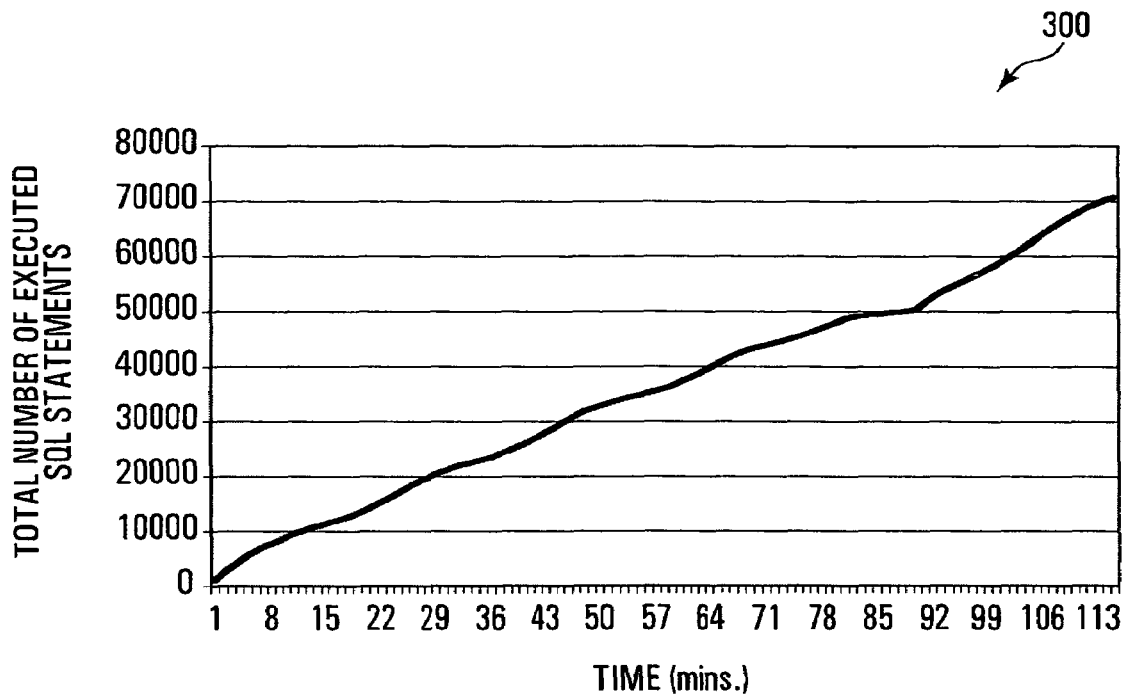
FIG. 3 illustrates database workload data comprising samples showing activity of the database system of FIG. 1 over time.

FIG. 3 illustrates a set of samples 300 representing activity of the database system 10 over a 120-minute time period. Although the data 300 is illustrated in the form of a continuous line graph, it actually consists of a set of discrete samples. More specifically, the exemplary data set 300 consists of 120 samples, each representing a snapshot of database activity taken at a 1-minute interval. Each sample in FIG. 3 is a cumulative measure of the number of SQL statements executed by the DBMS 12 since the beginning of the 120-minute time period. The workload data shown in FIG. 3 forms the input to the WORPAZ 32.

Figure 4:
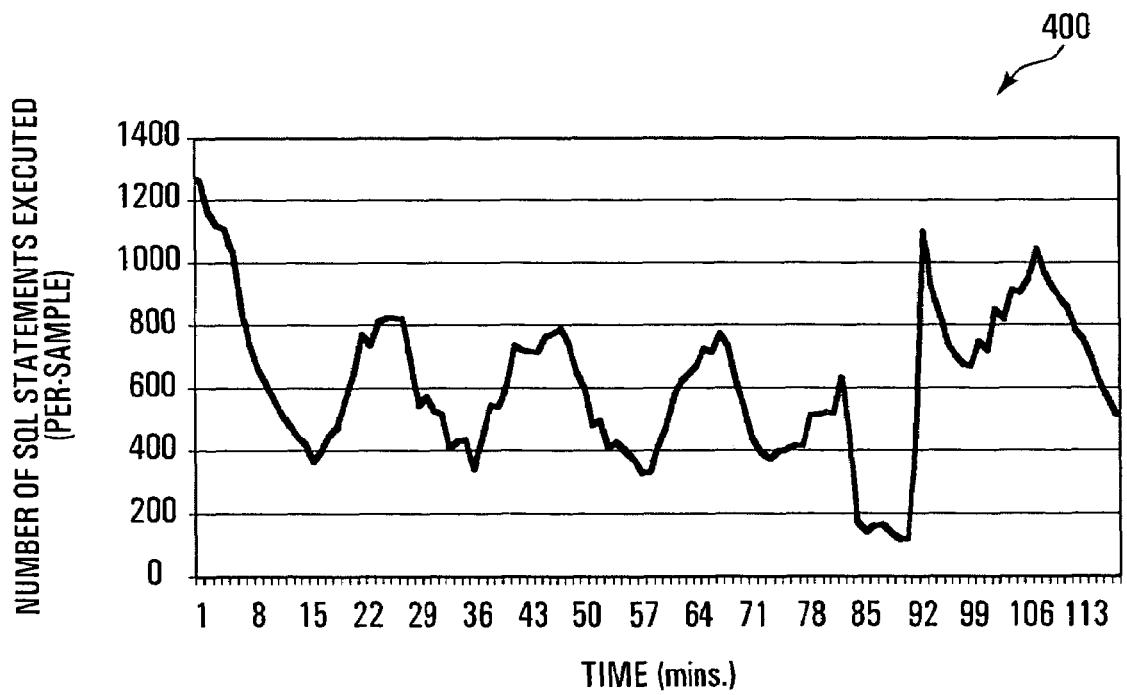
FIG. 4 illustrates another representation of the workload data set of FIG. 3 also showing database system activity over time.

FIG. 4 illustrates another representation 400 of the workload data set 300 of FIG. 3. In this representation, database activity is represented by the number of SQL statements executed by the DBMS 12 since the last sample (rather than since the beginning of the 120-minute time period). The data set 400 is generated by applying a difference operator to adjacent samples in the data set 300 of FIG. 3.

Figure 5:
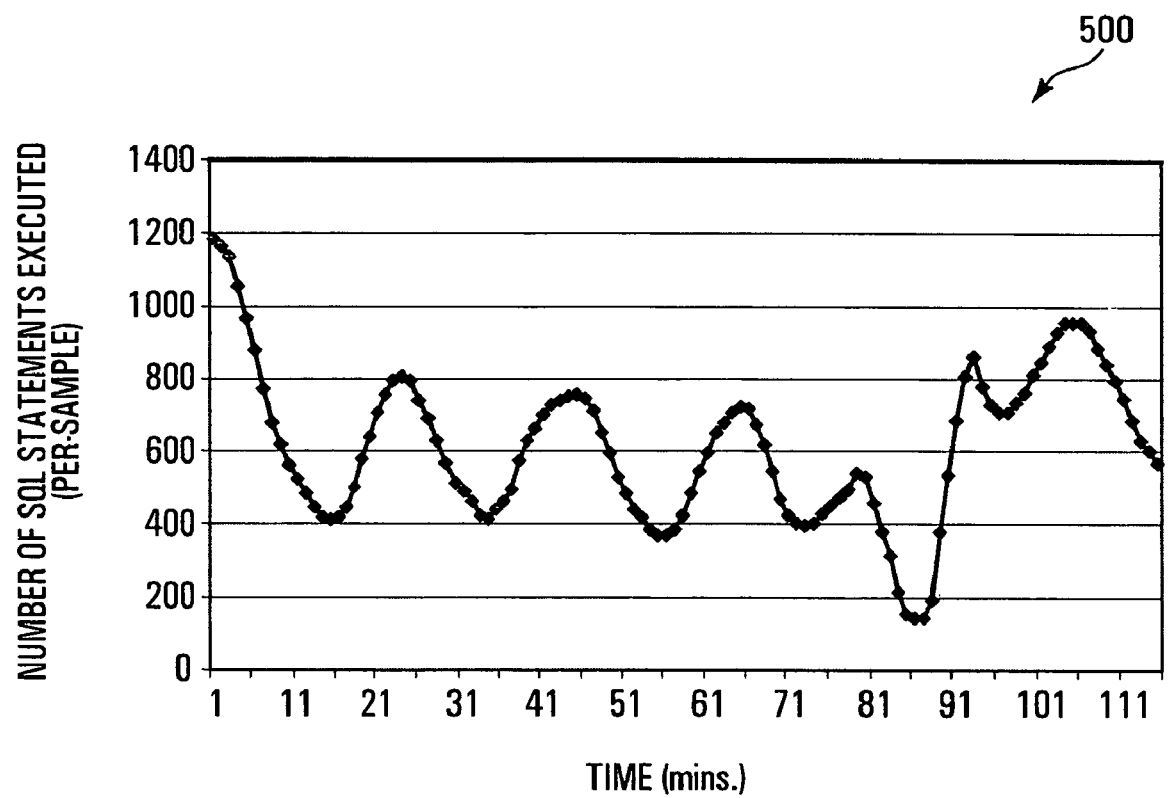
FIG. 5 illustrates the data set of FIG. 4 after application of a low pass filter.

FIG. 5 illustrates a workload data set 500 which consists of the set of database activity samples 400 of FIG. 4 after application of a low pass filter.

Figure 6:
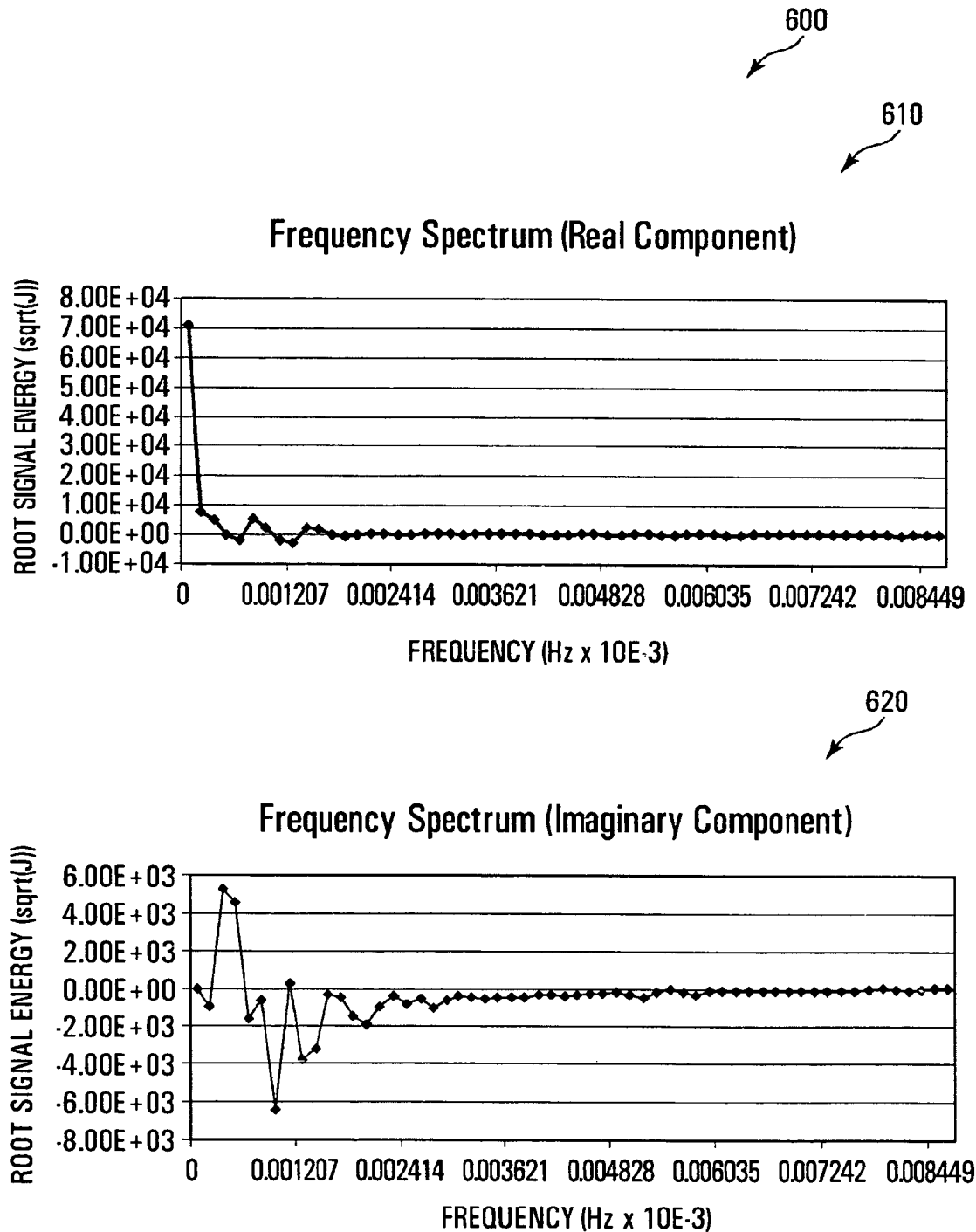
FIG. 6 illustrates a frequency spectrum generated from the data set of FIG. 5 using a Fourier transform.

FIG. 6 illustrates a frequency spectrum 600 which is generated by converting the data set 500 of FIG. 5 from the time domain to the frequency domain. The frequency spectrum 600 has a real component 610 and an imaginary component 620. As will be appreciated by a person of ordinary skill in the art, the frequency spectrum of FIG. 6 represents the same information as is represented in FIG. 5, except that the X-axis in FIG. 6 represents the frequency domain while the X-axis of FIG. 5 represents the time domain.

Figure 7:
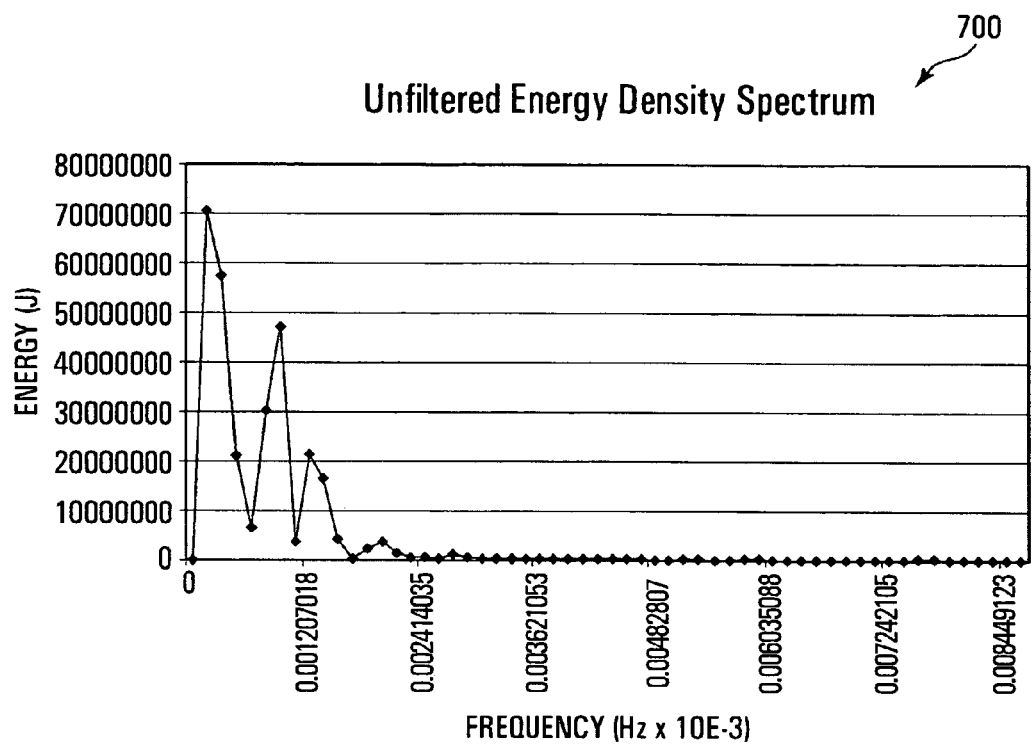
FIG. 7 illustrates an energy-density spectrum generated from the frequency spectrum of FIG. 6.

FIG. 7 illustrates an energy-density spectrum 700 generated from the frequency spectrum 600 of FIG. 6. The amplitude associated with a frequency indicated on the X-axis represents the energy of the database workload at that frequency. The energy units Joules (J) are applied to the Y-axis of FIG. 6.

Figure 8:
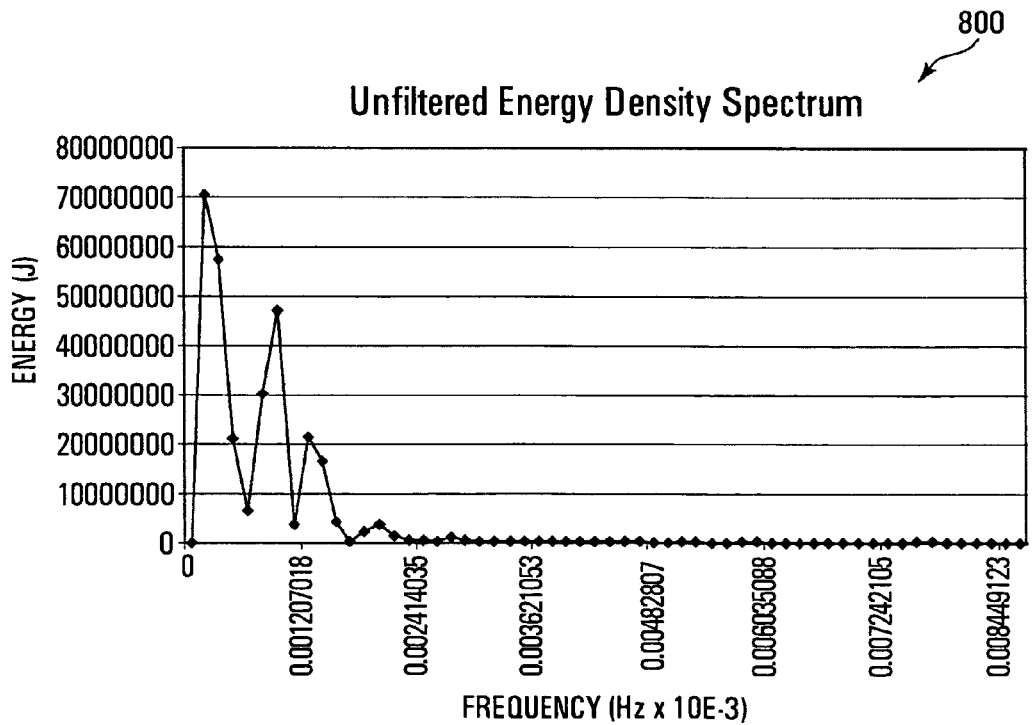
FIG. 8 illustrates the energy-density spectrum of FIG. 7 with low frequency components having been removed.

FIG. 8 illustrates the energy-density spectrum of FIG. 7 with low frequency components removed, i.e., after application of a high-pass filter.

Figure 9:
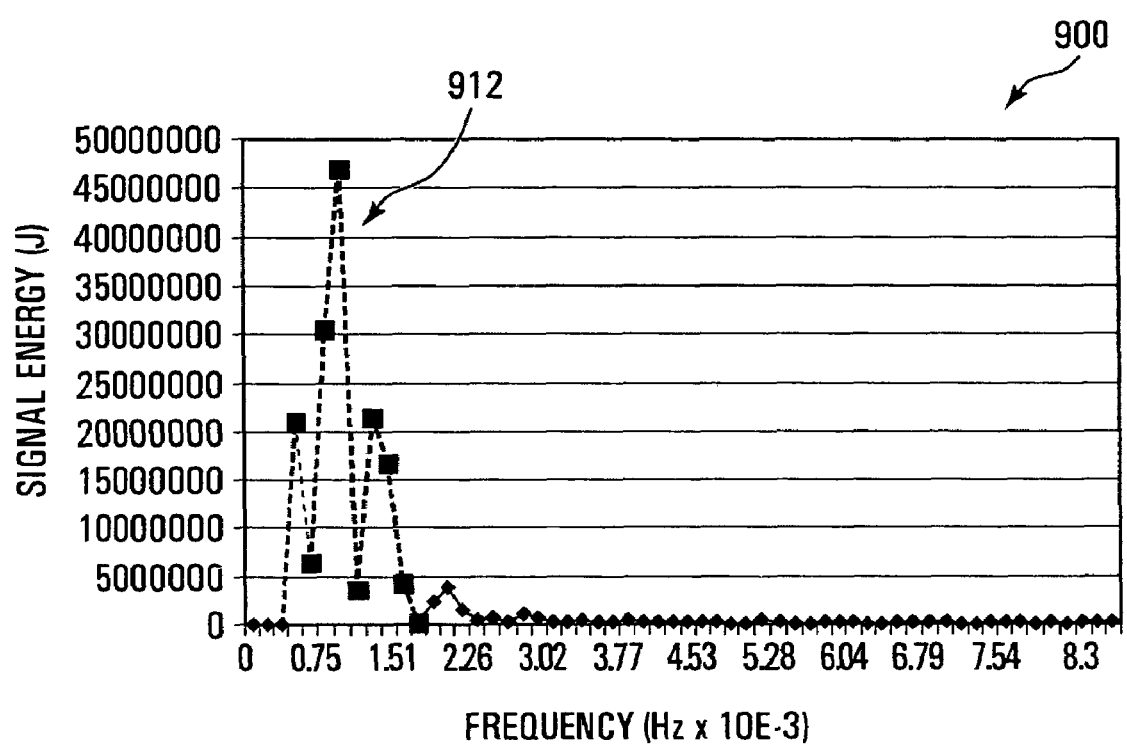

FIG. 9 illustrates the filtered energy-density spectrum of FIG. 8 with a sole fundamental peak 902 being indicated in dashed lines.

Figure 10:
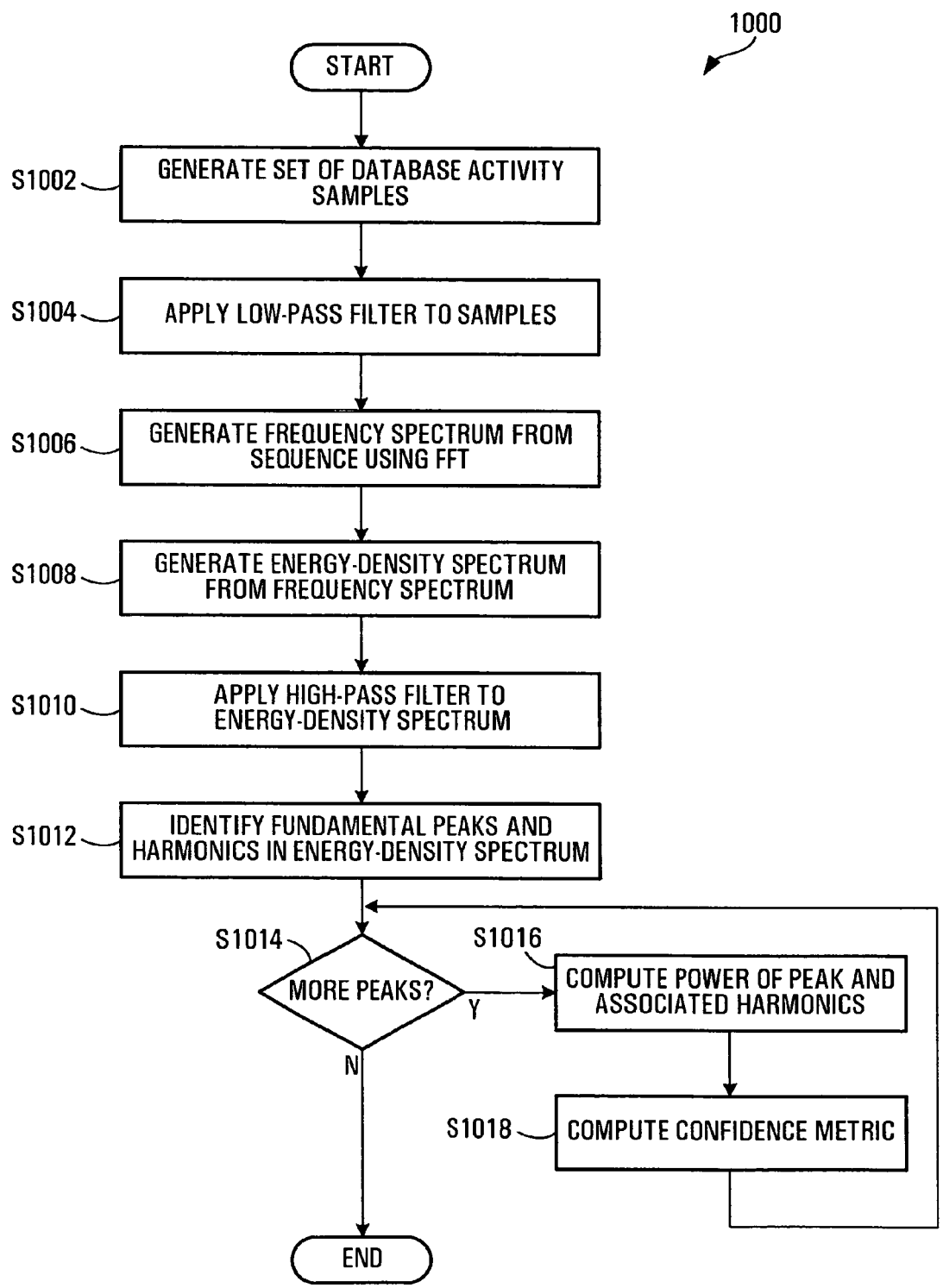
FIG. 10 illustrates operation of the workload periodicity analyzer of FIG. 2.

Operation 1000 of the workload periodicity analyzer 32 of FIG. 2 is illustrated in FIG. 10.

Initially, a set of samples of the activity of the database system 10 over time is generated (S1002). In the present embodiment, generation of this set of samples involves two steps.

First, the workload data set 300 of FIG. 3 is created. Creation of data set 300 entails sampling a running total of the number SQL statements executed by the DBMS 12 at 1-minute intervals over a sampling time period of 120 minutes. The sampling time period should preferably be at least twice as long as the longest expected cycle in the workload, to ensure that at least two representative cycles are sampled (if no information is known about expected workload cycle durations, the sampling period should simply be made very long). The performance monitor 30 controls the sampling. The samples are stored in file 18 within the non-volatile memory 16 of database system 10 (FIG. 2).

Second, the workload data set 400 of FIG. 4 is created from the workload data set 300 of FIG. 3. This step entails applying a difference operator to adjacent samples in the data set 300 of FIG. 3 to generate samples representative of the number of SQL statements executed by the DBMS 12 since the last sample. The data set 400 of FIG. 4 is generated by the workload periodicity analyzer 32 based on the data stored in file 18.

It will be appreciated that the data set 400 could be created without the initial creation of data set 300 and application of a difference operator thereto, if the performance monitor 30 has the capability to directly sample the number of SQL statements executed since the previous sample.

Next, a low-pass filter is applied to the samples 400 of FIG. 4 (S1004—FIG. 10). This may be achieved by computing a moving average for samples in the workload data set 400 (FIG. 4). For example, the moving average may use a neighborhood of width 5 centered on the point in question (i.e. two points on either side as well as the center point). The result is a filtered data set 500 (FIG. 5) in which rapid variations which are assumed to represent noise have been removed.

Thereafter, the filtered set 500 of database activity samples is converted from the time domain to the frequency domain (S1006—FIG. 10) to create a frequency spectrum 600 (FIG.

6). Conversion may be performed using a Fast Fourier Transform (FFT). The FFT may be a software-based function from a library, such as the "Fastest Fourier Transform in the West" (FFTW) library available at http://www.fftw.org/ for example, or a similar function.

From the frequency spectrum 600, an energy-density spectrum 700 (FIG. 7) is generated (S1008—FIG. 10). Individual energy components of the energy-density spectrum 700 are generated by squaring the magnitude of corresponding frequency components of the frequency spectrum 600 (FIG. 6).

In particular, an energy component of the energy density spectrum 700 is the sum of the squares of the magnitudes of the corresponding real component (from 610) and imaginary component (from 620). For example, if the complex number for one element of the frequency array is 3−4*i (with 3 being the real component and −4*i being the imaginary component (i being the square root of negative −1)) then the corresponding entry in the energy density spectrum array is:

$$(3)^2 + (-4)^2 = 9 + 16 = 25$$

This technique for generating an energy-density spectrum is described in "Signals and Systems, $2^{nd}$ Edition" by Oppenheim, Willsky and Nawab (published by Nawab) (p. 312), which is hereby incorporated by reference hereinto. The amplitude associated with each energy component of the resultant energy-density spectrum 700 represents the energy of the database workload at the associated frequency, which reflects the degree to which a workload period corresponding to the frequency dominates the database workload.

Next, a high-pass filter is applied to the energy-density spectrum 700 (S1010—FIG. 10) to create a filtered energy-density spectrum 800 (FIG. 8). In the present embodiment, application of the high-pass filter is effected by removing the three lowest frequency components of the energy-density spectrum 700, which are assumed to constitute low frequency noise.

It will be appreciated that the moving average computation performed in S1004 and low frequency component removal performed in S1010 in combination have the same effect of as would the application of a bandpass frequency filter to the workload data set 400 (FIG. 4).

Next, fundamental peaks and associated harmonics in the filtered energy-density spectrum 800 are identified (S1012). A fundamental peak is defined as the largest set of contiguous array elements in the energy-density spectrum 800 in which each element exceeds a threshold set at 5% percent of the highest amplitude element in the spectrum 800. Fundamental peaks represent concentrations of periodicity within the workload data, i.e., frequencies at which cycles in the workload data are strongest.

In the exemplary energy-density spectrum 900 of FIG. 9 (which is simply energy-density spectrum 800 with the sole fundamental peak indicated at 902), only one fundamental peak is found. This fundamental peak is shown in dashed lines in FIG. 9 at 902. The fundamental peak 902 spans the third to the tenth data points. The energy-density spectrum 900 components which comprise the peak (i.e. energy components at frequency bins 4-8) are marked with squares in FIG. 9. The center frequency of the fundamental peak 902, which is deemed to be the frequency at which the maximum energy value within the contiguous set occurs, is at the seventh data point.

It will be noted that the endpoints of the peak are defined in the present embodiment to be the first data points on either side of the center which are below the threshold. Summation is then performed from these endpoints (inclusively). Thus, both of the "left tail" of the peak (i.e. the energy component between the third and fourth data points) and the "right tail" of the peak (i.e. the energy component at between the eleventh and twelfth data points) are considered to be part of the peak.

Harmonics associated with each fundamental peak are also identified in S1012. A harmonic is a fundamental peak whose center frequency is an even multiple (plus or minus an adjustable tolerance) of a known fundamental peak. In the present embodiment, a peak should be at least 20% of the strength of the highest recorded energy density to be recognized as a harmonic. Based on this criterion, no harmonics strong enough to be recognized by the WORPAZ 32 exist in the energy-density spectrum 900 of the present example.

Thereafter, referring again to FIG. 10, for each identified fundamental peak (S1014), the power of the peak and any associated harmonics is computed (S1016).

The power of a fundamental peak is computed by summing the amplitude of each individual energy component comprising the peak. The power of the fundamental peak indicates the degree to which corresponding workload period dominates the workload of the database system 10.

For example, the power of fundamental peak 902 of FIG. 9 is computed by summing the energy of the energy-density spectrum components at frequency bins 4, 5, 6, 7 and 8. The power of each harmonic would be computed in the same manner. If no harmonics exist, as in the present case, the power of "the peak and any associated harmonics" will simply be the power of the peak.

A confidence metric indicating the degree to which the workload frequency associated with the fundamental peak dominates the database workload is then computed (S1018).

To facilitate computation of the confidence metric for a fundamental peak, the power of non-peak components of the energy-density spectrum 900 is first computed. To identify which components of the energy-density spectrum are the "non-peak" components, a technique known as Wold decomposition is used. In this technique, energy-density spectrum components comprising either a fundamental peak or a harmonic are deemed to be peak (i.e. periodic) components, and the remaining components are deemed to be non-peak (i.e. random) components.

In the present example, the components of energy-density spectrum 900 which comprise the sole fundamental peak 902 are classified as peak components, while the remaining components are classified as non-peak components (in view of the fact that only one fundamental peak 902 and no harmonics exist).

The sum of the power over the non-peak spectrum is then calculated by summing the energy of each individual non-peak component. This results in a computed "total non-peak power".

The confidence metric for a fundamental peak may then be computed by dividing the power of the peak and any associated harmonics (as computed in S1016) by the sum of the peak-plus-harmonics power (again from S1016) and the computed total non-peak power. The value of the confidence metric will vary from zero to one, with one corresponding to a perfect sine wave at the relevant frequency, which frequency reflects the length of the cycle.

In the present example, the confidence metric computed for the sole fundamental peak 902 is 0.898. This is computed based on peak and non-peak power values of 151464701 and 17214044 (respectively), as follows:

$$\text{metric} = 1514647101 / (151464701 + 17214044)$$
$$= 151464701 / 147425795$$
$$= 0.898$$

This represents a high degree of confidence that peaks of workload intensity will occur in the future at a frequency of 0.00086 Hz, or approximately every 21 minutes, assuming future database workload is similar to historical workload.

As will be appreciated by those skilled in the art, modifications to the above-described embodiment can be made without departing from the essence of the invention. For example, performance monitor 30 need not necessary store database workload data in a file 18. Rather, the data could alternatively be stored in SQL tables or in appropriate data structures in memory.

In another alternative, the application of a low-pass filter and high-pass filter to workload data need not be performed during periodicity analysis if workload data is known to be relatively free of noise. If filtering is performed, either or both of a low-pass filter and a high-pass filter may be applied. Alternatively, a bandpass filter having the same effect could be used. In the case of the high-pass filter, the described approach of dropping three lowest-frequency components is but one approach of many that could be used. Filtration may be performed in either of the time domain or the frequency domain.

It will also be appreciated that database workload data in alternative embodiments may not take the form of samples indicating a number of SQL statements executed over a time period. Rather, workload periodicity analyses may be based on other database performance metrics (e.g. as described above). The analysis can be applied to any single metric or mathematical combinations of metrics.

As well, it will be appreciated that workload periodicity analysis need not be performed in a target environment based on real-time data samples taken during actual database system operation. Rather, workload periodicity analysis may be performed in a factory simulation environment based on representative sets of data samples which approximate real-world database system activity, so as to create one or more "pre-fabricated models" of expected workload periodicity data. These models, which may comprise confidence metrics, expected workload frequencies, and/or other workload periodicity data generated by the method described herein, may be shipped "canned" along with the database system 10 for use as-needed in the target environment. That is, once the database system is activated in its target environment, the system may select the pre-fabricated model that best suits its current environment, and allocate system resources according to that model. This approach may alleviate some of the computational and data management burdens which may be introduced when sampling is performed real-time as described above.

Fundamentally, those skilled in the art will recognize that identifying fundamental peaks in the energy-density spectrum is equivalent to identifying fundamental peaks in the frequency spectrum, in the sense that the same peaks can be identified regardless of which spectrum is examined. Of course, when a threshold is set at a percentage X of a maximum element when examining the energy-density spectrum, to identify the same peak in the corresponding frequency spectrum, the threshold would need to be set at a percentage that is the square root of X of the maximum frequency spectrum element (e.g. if the threshold were set at 64% of the maximum element in the energy-density spectrum, it would need to be set at 80% of the maximum element in the frequency spectrum). Of course, both of the real and imaginary components of the frequency spectrum should be taken into account when identifying fundamental peaks.

Other modifications will be apparent to those skilled in the art and, therefore, the invention is defined in the claims.

What is claimed is:

1. A computer data processing system implemented method of directing a data processing system to determine database workload periodicity, the computer data processing system implemented method comprising:

converting database activity samples spanning a time period from the time domain to the frequency domain, said converting resulting in a frequency spectrum;

identifying fundamental peaks of said frequency spectrum; and allocating database resources based on at least one of said fundamental peaks, wherein:

said identifying fundamental peaks of said frequency spectrum comprises:

generating an energy-density spectrum from said frequency spectrum; and identifying fundamental peaks of said energy-density spectrum, said identifying fundamental peaks of said energy-density spectrum comprises:

selecting an energy component of said energy-density spectrum, said selected energy component having a highest amplitude of all energy components of said energy-density spectrum;

setting a threshold based on said amplitude of said selected energy component; and including within a fundamental peak each adjacent energy component having an amplitude exceeding said threshold, and for each fundamental peak of said energy-density spectrum, the power of said fundamental peak and any associated harmonics is computed.

2. The computer data processing system implemented method of claim 1 wherein said generating an energy-density spectrum comprises:

squaring a magnitude of said frequency component for each frequency component in said frequency spectrum to produce a corresponding energy component of said energy-density spectrum.

3. The computer data processing system implemented method of claim 1 wherein said computing the power of said fundamental peak and any associated harmonics comprises:

computing a power of said fundamental peak;

identifying harmonics of said fundamental peak;

computing, for each identified harmonic, a power of said harmonic; and adding, for each identified harmonic, said power of said harmonic to said power of said fundamental peak.

4. The computer data processing system implemented method of claim 3 wherein said computing a power of said fundamental peak comprises:

summing the amplitude of each energy component included within said fundamental peak.

5. The computer data processing system implemented method of claim 1 further comprising:

computing, for a fundamental peak identified in said energy-density spectrum, a confidence metric by:

computing a total non-peak power of said energy-density spectrum; and dividing said power of said fundamental peak and any associated harmonics by a sum of said power of said fundamental peak and any associated harmonics and said total non-peak power.

6. The computer data processing system implemented method of claim 5 wherein said computing a total non-peak power comprises:

classifying energy components of said energy-density spectrum as non-peak components if said components are not part of a fundamental peak or associated harmonics; and summing the amplitude of said non-peak components.

7. The computer data processing system implemented method of claim 1 further comprising:

applying either or both of a low pass filter and a high pass filter to said database activity samples in either of said time domain or said frequency domain.

8. The computer data processing system implemented method of claim 1 wherein said database activity samples are taken at regular time intervals during said time period.

9. The computer data processing system implemented method of claim 1 wherein said time period is at least twice as long as a longest cycle in said database workload.

10. The computer data processing system implemented method of claim 1 wherein said database activity samples each represent a number of database commands executed during a time interval.

11. The computer data processing system implemented method of claim 1 wherein said converting comprises performing a Fast Fourier Transform.

* * * * *